Patented Dec. 28, 1937

2,103,273

UNITED STATES PATENT OFFICE 2,103,273

POLYHYDRIC ALCOHOL-POLYBASIC ALIPHATIC ACID RESIN

Israel Rosenblum, Jackson Heights, N. Y.

No Drawing. Application January 26, 1934,
Serial No. 708,477

16 Claims. (Cl. 260—8)

The present invention relates to the production of soluble, fatty acid-modified alkyd resins wherein the polybasic acid consists entirely or preponderantly of a dibasic aliphatic acid of the type which forms polyphase systems, including an insoluble phase, on simultaneous heating with polyhydric alcohol, like glycerol, and a fatty acid of the type obtainable by hydrolysis of a fatty oil or fat.

According to the present invention, fusible and soluble resins suitable for the manufacture of air-drying and baking varnishes, lacquers and paints are produced by the simultaneous reaction of glycerol, one or more polybasic acids including a dibasic aliphatic acid of the type which normally produces a non-homogeneous mixture on reaction with glycerol and fatty oil acids, a monobasic acid of high molecular weight, such as an acid obtainable by hydrolysis from a drying or non-drying oil or from a fat, in quantity sufficient to make the product oil-soluble, and a saturated, monobasic aliphatic acid of one to five carbon atoms.

Investigations conducted by me on the reaction between glycerol, a polybasic aliphatic acid, such as maleic acid, malic acid, succinic acid, etc. and, for example, a drying oil acid, such as linseed oil acids, have shown that when these materials are mixed and reacted together in the manner commonly employed in making polyhydric alcohol-polybasic acid resins (known generally as alkyd resins) it is impossible to obtain a homogeneous, fusible, soluble resin suitable for use in the varnish, lacquer, enamel and paint industries. Thus I have found that when glycerol, maleic acid and linseed oil acids are reacted together, two distinct layers are formed which cannot be made to fuse together to form a homogeneous mass even after prolonged heating; after a certain time the lower layer gels and the mass becomes useless for varnish and similar purposes. Similar results are obtained if the glycerol is reacted first with the maleic acid and subsequently with the drying oil acid, and when the acids are first heated together and the glycerol subsequently added, and also when the glycerol is first heated with considerably less than an equimolecular proportion of fatty oil acids followed by reaction with the maleic acid. The processes heretofore employed for the manufacture of resins by reaction between glycerol, phthalic acid and drying oil acids therefore result in failure when the phthalic acid is replaced by a polybasic aliphatic acid such as maleic acid.

It is the object of the present invention to provide a process whereby glycerol or other suitable polyhydric alcohol, a polybasic aliphatic acid of the type which forms a non-homogeneous system on simultaneous reaction with glycerol and a fatty oil or fat acid, particularly maleic, succinic, malic, and tartaric acids, and an acid obtainable from a fatty oil or from a fat may be reacted together simultaneously and yet form a homogeneous, fusible, oil soluble resin suitable for use in the manufacture of varnishes, lacquers, enamels, and paints. More particularly, it is an object of the invention to provide a uniform and homogeneous resin which is soluble in the common solvents, including petroleum and coal tar distillates and mixtures thereof, and is compatible with oils without decomposition, by the use of materials which heretofore under similar conditions have yielded only non-homogeneous, useless masses.

According to the present invention, the mixture of the glycerol, the polybasic aliphatic acid, and the high molecular weight oil or fat acid is caused to react in the presence of a monobasic aliphatic acid of comparatively low molecular weight. I have found that such low molecular weight aliphatic acid takes part in the reaction and acts in such manner as to favor the formation of a homogeneous resinous product and eliminates any tendency toward the formation of two immiscible layers or of two non-compatible materials.

The preferred monobasic aliphatic acids of low molecular weight employed by me are those having no more than five carbon atoms, the saturated acids such as formic, acetic and propionic giving very satisfactory results.

By the use of these low molecular weight acids it thus becomes possible to produce homogeneous, oil-soluble resins of relatively low acid number without danger of gelling, under conditions under which in the absence of such acids the polybasic aliphatic acid and the high molecular weight fatty oil or fat acid would yield a non-homogeneous system with glycerol, part of which would ultimately gel and become infusible.

The present invention thus embodies the discovery that by the addition of a low molecular weight aliphatic acid, preferably one having no more than five carbon atoms, and particularly volatile acids containing from one to three carbon atoms, to a mixture of glycerol, a polybasic aliphatic acid and a relatively large quantity of an acid obtainable from a fatty oil or from a fat, which mixture alone would on heating yield two incompatible materials, the formation of such incompatible materials is prevented and there is produced a uniform and homogeneous resinous mass. By the use of such low molecular weight aliphatic acid, moreover, the reaction can be continued until a practically neutral resin is obtained, or a resin of such a low acidity as not to militate against its use in the varnish, lacquer, paint and enamel industry. If desired, the reaction may be carried out in the presence of a solvent, such as solvent naphtha, in which case the heating may be continued for a longer time to reduce the acid number still further.

In carrying out the present invention, a mixture of glycerol, a polybasic aliphatic acid of the type above indicated, a low molecular weight monobasic aliphatic acid, and an oil or fat acid, such as linseed oil acids, in quantity sufficient to make the product oil-soluble, is heated to reaction temperature and the heating continued until a homogeneous, fusible, soluble resin of substantially neutral character, or of relatively low acid number, is obtained. A uniform resin will be produced even though, in the absence of the low molecular weight monobasic aliphatic acid, a non-homogeneous mass, tending to gel quickly, would be obtained.

I have found further that oleic acid can with advantage be substituted for all or part of the linseed oil acids. It is the teaching of the prior art that alkyd resins containing a non-drying fatty acid, such as oleic acid, are not soluble in drying oils at ordinary temperatures whereas alkyd resins containing linseed oil acids are soluble at such temperatures (see the patent to Kienle No. 1,893,873, page 1, lines 32 to 44). I have however discovered that when oleic acid is substituted for the linseed oil acids in certain embodiments of my process the product can be mixed with as much as 8 times the quantity of drying oil that a similar resin containing linseed oil acid, but composed otherwise of the same materials in the same proportions, can tolerate. When this large quantity of oil, such as linseed or China-wood oil, is mixed with the oleic acid resin, the latter will yield an air drying varnish or enamel.

My improved resins can be used in oil solution in the clear form with known driers, or pigmented in the form of paints and enamels. The resins are compatible with drying and non-drying oils at room temperature or at the temperatures ordinarily employed for solution (below about 110° C., that is, below temperatures at which the oil is decomposed and at which the oil acids are re-esterified, such temperatures being usually between 200 and 300° C.); the resins are compatible and miscible also with oil varnishes, natural and synthetic resins, including fresh and fossil resins and their esters, phenol-aldehyde resins, other alkyd resins, etc.

Among the polybasic aliphatic acids that may be employed in the above described reaction, maleic and succinic acids are preferred, although malic, tartaric, and other dibasic acids or mixtures thereof may be used. While I prefer to react all of the ingredients simultaneously, the process can be conducted in steps, as by reacting the glycerol first with the high molecular weight oil or fat acid and/or with the low molecular weight monobasic aliphatic acid, after which the partial ester is reacted with the other acids.

The proportions of the reacting materials are preferably such as theoretically to yield a more or less neutral product. A slight excess of the glycerol may be employed to allow for losses during the reaction and for impurities.

The present invention is also applicable to reactions in which glycerol is heated with phthalic acid, a polybasic aliphatic acid, for example, maleic acid, and an oil or fat acid, the proportions of the acids being such that upon heating two immiscible layers are formed. By the addition of a low molecular weight, monobasic aliphatic acid as above-described, preferably in place of an equivalent part of the oil or fat acid, the formation of two permanently immiscible layers or of a non-homogeneous mixture is prevented and a homogeneous, soluble, fusible resin is obtained.

The invention will be further described with the aid of the following examples which illustrate several satisfactory methods of carrying out the invention.

Example 1

|  | Mol. | Grams |
|---|---|---|
| Linseed oil fatty acids | 1 | 280 |
| Formic acid | 1 | 46 |
| Maleic anhydride | 0.5 | 49 |
| Glycerol | 1 | 92 | are heated to approximately 230° C. and kept at such temperature for about 1½ hours. A homogeneous resinous product is obtained having an acid number of 36. The resin is soluble in petroleum and coal tar solvents and is compatible with linseed oil in all proportions at room temperature.

Example 2

|  | Mols | Grams |
|---|---|---|
| Linseed oil fatty acids | 1 | 280 |
| Formic acid | 3 | 138 |
| Maleic anhydride | 1 | 98 |
| Glycerol | 2 | 184 | are heated to 210°–230° C. The layers which form at first gradually disappear and a uniform, clear material is obtained. After about one hour at the above temperatures the acid number falls to 33. The resin is soluble in coal tar solvents and in mixtures of coal tar and petroleum solvents and is compatible with linseed oil in limited proportions.

Example 3

|  | Mol. | Grams |
|---|---|---|
| Linseed oil fatty acids | 1 | 280 |
| Acetic anhydride | ½ | 51 |
| Maleic anhydride | ½ | 49 |
| Glycerol | 1 | 92 | are heated to 230°. The lower layer which forms at first is gradually dissolved as the reaction proceeds. After about 2½ hours at this temperature an acid number of 24 is reached. The resin is soluble in petroleum solvents and in coal tar solvents, and is compatible with linseed oil in all proportions at room temperature, and also with natural and synthetic resins and with oil varnishes.

Example 4

|  | Mols | Grams |
|---|---|---|
| Linseed oil fatty acids | 1 | 280 |
| Acetic anhydride | 1½ | 153 |
| Maleic anhydride | 1 | 98 |
| Glycerol | 2 | 184 | are heated to 230° C., the reaction proceeding as in Example 3. After about one hour at this temperature an acid number of 26 is reached. The resin is soluble in coal tar solvents and in mixtures of coal tar solvents with petroleum solvents;

it is also compatible with linseed oil in limited proportions, and with natural and synthetic resins and varnishes.

Example 5

| | Mols | Grams |
|---|---|---|
| Linseed oil fatty acids | 1 | 280 |
| Acetic acid | 2 | 120 |
| Maleic anhydride | 1½ | 147 |
| Glycerol | 2 | 184 | on heating for about one hour at 230° give a clear viscous resin, whose acid number is 50. It is soluble in coal tar solvents, and can stand the addition of a limited amount of petroleum solvents.

Example 6

| | Mols | Grams |
|---|---|---|
| Linseed oil fatty acids | 1 | 280 |
| Formic acid | 3 | 138 |
| Succinic acid | 1 | 118 |
| Glycerol | 2 | 184 | are heated to 230° C. and kept at such temperature for six hours. A practically neutral resin is obtained. It is soluble in all proportions in coal tar solvents and in mixtures of coal tar solvents with petroleum solvents and is compatible with linseed oil in all proportions.

Example 7

| | Mols | Grams |
|---|---|---|
| Oleic fatty acids | 1 | 282 |
| Formic acid | 3 | 138 |
| Maleic anhydride | 1 | 98 |
| Glycerol | 2 | 184 | are heated to 230° C. for about 2 hours. The layers which are at first observed gradually disappear at this temperature and a uniform, clear resin is obtained having an acid number of 15. It is soluble in coal tar solvents and stands the addition of petroleum solvents and is compatible with linseed oil at room temperature up to two parts of linseed oil to one of resin. This resin is considerably more soluble in common solvents such as petroleum solvent, coal tar solvents or mixtures of both and is compatible with considerably more linseed oil than the similar resin made with linseed oil fatty acids, as in Example 2. The resin is compatible also with other resins and with varnishes.

All of the above examples can be carried out by reacting in steps. Thus the glycerol may first be partially esterified with the linoleic acid, or with both the monobasic aliphatic acids. Stirring during reaction is advisable. These materials can, if desired, be heated in the presence of a neutral solvent, which usually increases the time of reaction, and permits lower acid numbers to be reached.

The maleic or equivalent acid can be replaced by a mixture of such acid and phthalic acid, particularly one in which the proportion of the acids is such (for example, 4 mols of maleic acid to 1 mol. of phthalic acid) as would produce two immiscible layers if reacted with the glycerol and the oil or fat acid. It will be obvious that in place of the acids their anhydrides in equivalent quantities may be employed.

The linseed oil acids can be replaced in whole or in part by the acids of China-wood oil, soya bean oil, olive oil, cottonseed oil, rapeseed oil, fish oil, sesame oil, sunflower seed oil and other drying and non-drying oils or by mixtures of such acids.

Various drying and non-drying oils can be added to the initial reacting mixture, or a portion of the fatty oil or fat acid can be substituted by a drying or non-drying oil which hydrolyzes during the course of the reaction into fatty acids and glycerol. In the absence of a low molecular weight monobasic aliphatic acid, as above-described, such mixture of materials would be inoperative to produce a homogeneous product as two immiscible or non-compatible materials would form. The oil or oils can be added towards the end of the reaction when elevated temperatures have been reached.

In place of the glycerol there may be employed other suitable polyhydric alcohols, preferably those containing at least three hydroxyl groups, such as the polyglycerols, etc.

Where in the claims I employ the expression "aliphatic acid of low molecular weight", such expression is to be understood to mean an acid having no more than five carbon atoms.

I claim:

1. The method of producing homogeneous, fusible, oil-soluble resins, which comprises reacting substantially simultaneously approximately 1 mol. of glycerol, ½ mol. of maleic acid, ½ to 1½ mols of a saturated monobasic aliphatic acid of one to five carbon atoms, and ½ to 1 mol. of the acids obtained by hydrolysis from a fatty oil or fat.

2. The homogeneous, soluble resin comprising the product of the simultaneous reaction of glycerol, maleic acid, acetic acid, and a high molecular weight fatty oil acid.

3. The homogeneous, fusible, oil-soluble resin comprising the product of the simultaneous reaction of glycerol, maleic acid, formic acid, and the acids of a fatty oil.

4. The homogeneous, fusible, oil-soluble resin comprising the product of the simultaneous reaction of glycerol, a polybasic aliphatic acid of the type which on simultaneous reaction with glycerol and fatty oil acids yields a permanently non-homogeneous mass, a saturated, monobasic, aliphatic acid of one to five carbon atoms, and oleic acid.

5. The method of producing homogeneous, fusible, oil-soluble resins, which comprises reacting simultaneously (1) glycerol, (2) a polybasic aliphatic acid of the group consisting of maleic, succinic, malic and tartaric acids, and their anhydrides, (3) phthalic acid, (4) a saturated monobasic aliphatic acid of one to five carbon atoms, and (5) an acid obtainable by hydrolysis from a fatty oil or a fat in quantity sufficient to render the product oil-soluble, the proportion of the polybasic aliphatic acid and phthalic acid being such as to yield a non-homogeneous product on simultaneous reaction with the glycerol and fatty oil or fat acid but in the absence of the monobasic aliphatic acid of low molecular weight.

6. The method of producing homogeneous, fusible, oil-soluble resins, which comprises reacting simultaneously (1) glycerol, (2) a polybasic aliphatic acid of the group consisting of maleic, succinic, malic and tartaric acids and their anhydrides, (3) a saturated monobasic aliphatic acid of one to five carbon atoms, and (4) an acid obtainable by hydrolysis from a fatty oil or a fat in quantity sufficient to render the product oil-soluble.

7. The method according to claim 6, wherein the proportions of the reacting materials are such as theoretically to yield a substantially neutral resin.

8. The method of producing homogeneous, fusible, oil-soluble resins, which comprises reacting simultaneously (1) glycerol, (2) a polybasic aliphatic acid of the group consisting of maleic, succinic, malic and tartaric acids and their anhydrides, (3) a saturated monobasic aliphatic acid of one to five carbon atoms, and (4) a drying oil acid in quantity sufficient to render the product oil-soluble.

9. The method of producing homogeneous, fusible, oil-soluble resins, which comprises reacting simultaneously (1) glycerol, (2) a polybasic aliphatic acid of the group consisting of maleic, succinic, malic and tartaric acids and their anhydrides, (3) a saturated monobasic aliphatic acid of one to five carbon atoms, and (4) oleic acid in quantity sufficient to render the product oil-soluble.

10. The method of producing homogeneous, fusible soluble resins, which comprises reacting simultaneously (1) glycerol, (2) a polybasic aliphatic acid of the group consisting of maleic, succinic, malic and tartaric acids and their anhydrides, (3) a saturated monobasic aliphatic acid of one to five carbon atoms, (4) an acid obtainable by hydrolysis of a fatty oil or a fat, and (5) a drying oil.

11. A homogeneous, fusible, oil-soluble resin comprising the product of the simultaneous reaction of (1) glycerol, (2) a polybasic aliphatic acid of the group consisting of maleic, succinic, malic and tartaric acids and their anhydrides, (3) formic acid, and (4) acids obtainable by hydrolysis from a fatty oil or a fat.

12. The homogeneous, fusible, soluble resin comprising the product of the simultaneous reaction of (1) glycerol, (2) a polybasic aliphatic acid of the group consisting of maleic, succinic, malic and tartaric acids and their anhydrides, (3) phthalic acid, (4) a saturated monobasic aliphatic acid of one to five carbon atoms, (5) and acids obtainable by hydrolysis from a fatty oil or fat, the proportion of polybasic aliphatic acid to phthalic acid being such as to yield, in the absence of the low molecular weight monobasic aliphatic acid, a permanently non-homogeneous reaction product containing two non-compatible materials.

13. A resinous composition consisting of the product of the simultaneous reaction essentially of glycerol, maleic acid, a saturated monobasic aliphatic acid of one to five carbon atoms, and the acids of a fatty oil or of a fat.

14. The homogeneous fusible, oil-soluble resin comprising the product of the simultaneous reaction of (1) glycerol, (2) an acid of the group consisting of maleic, succinic, malic and tartaric acids and their anhydrides, (3) acetic acid, and (4) a high molecular weight fatty oil acid.

15. The homogeneous, fusible, oil-soluble resin comprising the product of the simultaneous reaction of (1) glycerol, (2) a polybasic aliphatic acid of the group consisting of maleic, succinic, malic and tartaric acids and their anhydrides, (3) phthalic acid, (4) a saturated monobasic aliphatic acid of one to five carbon atoms, and (5) a fatty oil acid.

16. A resinous composition consisting of the product of the simultaneous reaction essentially of (1) glycerol, (2) a polybasic aliphatic acid of the group consisting of maleic, succinic, malic and tartaric acids and their anhydrides, (3) a saturated monobasic aliphatic acid of one to five carbon atoms, and (4) a high molecular weight aliphatic acid of a fatty oil or of a fat.

ISRAEL ROSENBLUM.